United States Patent
Shutt

(10) Patent No.: US 9,542,618 B2
(45) Date of Patent: Jan. 10, 2017

(54) SYSTEM AND METHOD FOR PLEOGRAPHIC RECOGNITION, MATCHING, AND IDENTIFICATION OF IMAGES AND OBJECTS

(71) Applicant: Michael Shutt, Ewing, NJ (US)

(72) Inventor: Michael Shutt, Ewing, NJ (US)

(*) Notice: Subject to any disclaimer, the term of this patent is extended or adjusted under 35 U.S.C. 154(b) by 0 days.

(21) Appl. No.: 14/822,974

(22) Filed: Aug. 11, 2015

(65) Prior Publication Data
US 2015/0347868 A1 Dec. 3, 2015

Related U.S. Application Data

(63) Continuation of application No. 12/558,520, filed on Sep. 14, 2009, now abandoned.

(60) Provisional application No. 61/191,836, filed on Sep. 12, 2008.

(51) Int. Cl.
G06K 9/68 (2006.01)
G06K 9/62 (2006.01)
G06K 9/00 (2006.01)

(52) U.S. Cl.
CPC ......... *G06K 9/6202* (2013.01); *G06K 9/00214* (2013.01); *G06K 9/6212* (2013.01); *G06K 9/6267* (2013.01); *G06K 9/68* (2013.01)

(58) Field of Classification Search
CPC .............. G06F 17/30253; G06F 17/30247; G06F 3/016; G06F 17/5036; G06F 2217/10; G06K 9/46; G06K 9/4676; G06K 9/6212; G06K 9/00456; G06K 9/00288; G06K 9/00536; G06K 2019/06253; G06K 7/1447; G06K 9/6202; G06K 9/00; G06K 9/00369; G06K 9/00214; G06K 9/6267; G06K 9/00201; G06K 9/00624; G06K 9/32; G06K 9/3241; G06K 9/469; G06K 2209/40; Y10S 707/99936; G06T 7/0079; G06T 2201/0065; G06T 2207/20148; G06T 17/00; G06T 2207/10024; G06T 7/0002; G06T 7/0028; G06T 15/00; G06T 2207/10012; G06T 7/0075; G06T 19/00; G06T 2219/008; G06Q 20/20; G06Q 30/08; H04N 2201/3253; H04N 1/00037; H04N 2201/3205; H04N 2201/3226; G01N 2021/8864; G01N 21/8851; G01N 21/95607; G01S 13/89; G01S 17/89; G01S 7/412; G01S 19/42; A61B 5/411; A61B 5/4023; A61B 5/7264; A61B 5/1128; A61B 5/1176; A61B 18/203; A61B 2018/00904; A61B 2034/2072; A61B 2090/363; A61B 2090/3983; G05D 1/0257; G03F 7/705; G02C 7/025; F41G 7/2226; G01B 11/24
USPC ....... 382/115, 218, 305, 306, 103, 165, 217, 382/219, 233, 284; 715/700, 835
See application file for complete search history.

(56) References Cited

U.S. PATENT DOCUMENTS

| | | | | |
|---|---|---|---|---|
| 5,579,471 A * | 11/1996 | Barber | ................ | G06F 17/3025 382/209 |
| 5,636,292 A * | 6/1997 | Rhoads | ................ | G06Q 20/341 235/382 |
| 5,751,286 A * | 5/1998 | Barber | ................ | G06F 17/3025 382/209 |

(Continued)

*Primary Examiner* — Vu Le
*Assistant Examiner* — Aklilu Woldemariam
(74) *Attorney, Agent, or Firm* — Keene IP Law, LLC

(57) ABSTRACT

The inventive data processing system and method enable recognition, matching, and/or identification of images and/or of objects, utilizing at least one novel pleographic data processing technique.

13 Claims, 14 Drawing Sheets

(56) References Cited

U.S. PATENT DOCUMENTS

| | | | | |
|---|---|---|---|---|
| 5,913,205 | A * | 6/1999 | Jain | G06F 17/30256 |
| 5,917,928 | A * | 6/1999 | Shpuntov | A61B 5/1172 |
| | | | | 382/124 |
| 6,628,808 | B1 * | 9/2003 | Bach | G06K 9/036 |
| | | | | 235/380 |
| 6,721,463 | B2 * | 4/2004 | Naoi | G06K 9/2054 |
| | | | | 358/403 |
| 7,054,509 | B2 * | 5/2006 | Rom | G06K 9/00469 |
| | | | | 382/217 |
| 7,130,466 | B2 * | 10/2006 | Seeber | G06F 17/30256 |
| | | | | 382/190 |
| 7,324,711 | B2 * | 1/2008 | Nagarajan | G06K 9/00449 |
| | | | | 375/E7.2 |
| 7,844,081 | B2 * | 11/2010 | McMakin | G01S 13/887 |
| | | | | 382/115 |
| 8,229,222 | B1 * | 7/2012 | Silver | G06K 9/481 |
| | | | | 382/141 |
| 2005/0054910 | A1 * | 3/2005 | Tremblay | A61B 5/055 |
| | | | | 600/411 |
| 2005/0187916 | A1 * | 8/2005 | Levin | G06F 7/02 |
| 2005/0207622 | A1 * | 9/2005 | Haupt | G06K 9/00288 |
| | | | | 382/118 |
| 2006/0064017 | A1 * | 3/2006 | Krishnan | G06K 9/6217 |
| | | | | 600/450 |
| 2007/0263907 | A1 * | 11/2007 | McMakin | G01S 13/887 |
| | | | | 382/115 |
| 2008/0075348 | A1 * | 3/2008 | Rappaport | A61B 5/107 |
| | | | | 382/132 |
| 2009/0082637 | A1 * | 3/2009 | Galperin | G06F 19/321 |
| | | | | 600/300 |
| 2010/0054525 | A1 * | 3/2010 | Gong | G06K 9/6206 |
| | | | | 382/100 |
| 2012/0072452 | A1 * | 3/2012 | Stratman | G06Q 10/06 |
| | | | | 707/772 |
| 2012/0330447 | A1 * | 12/2012 | Gerlach | G01B 11/24 |
| | | | | 700/95 |
| 2014/0340570 | A1 * | 11/2014 | Meyers | H04N 5/211 |
| | | | | 348/370 |

* cited by examiner

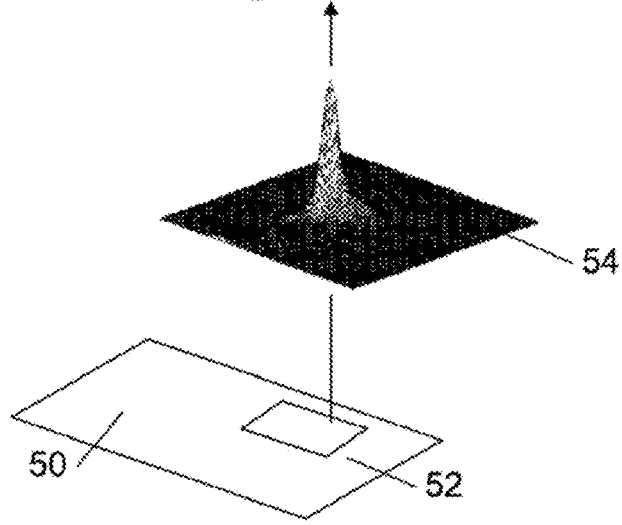
Fig. 3A
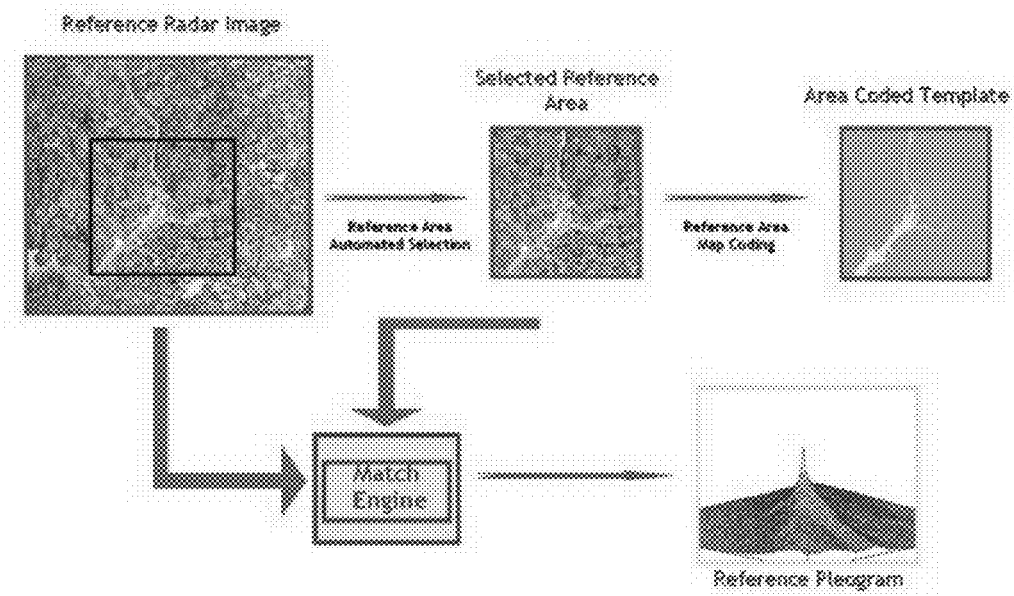
Fig. 3B. Reference Image Formation

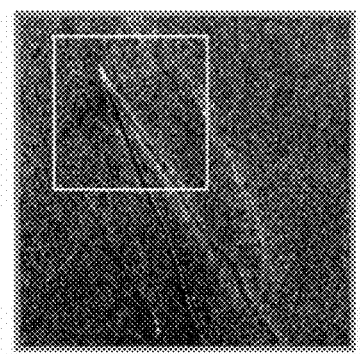
Fig.4. Reference Wake Radar Image
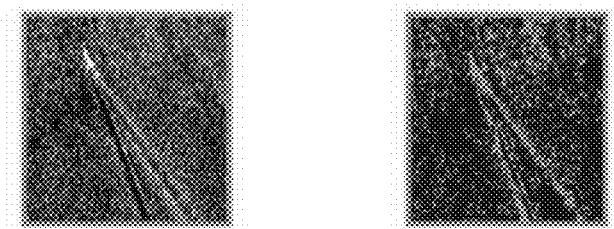
Fig.5. Reference Area and Area Coded Template

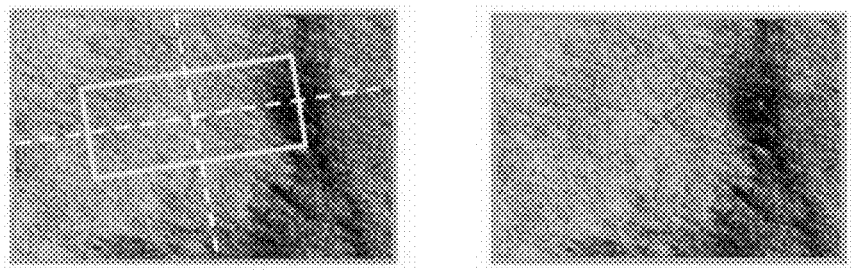
Fig.6. SAR Figure-8 Signature Image (left) and Pre-Processed Image (right)
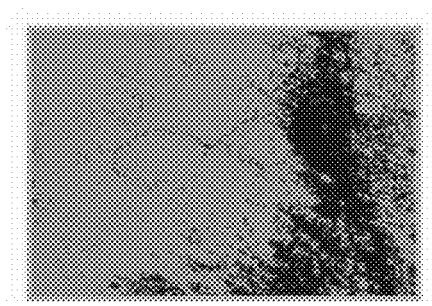
Fig.7. Figure-8 Signature ACT
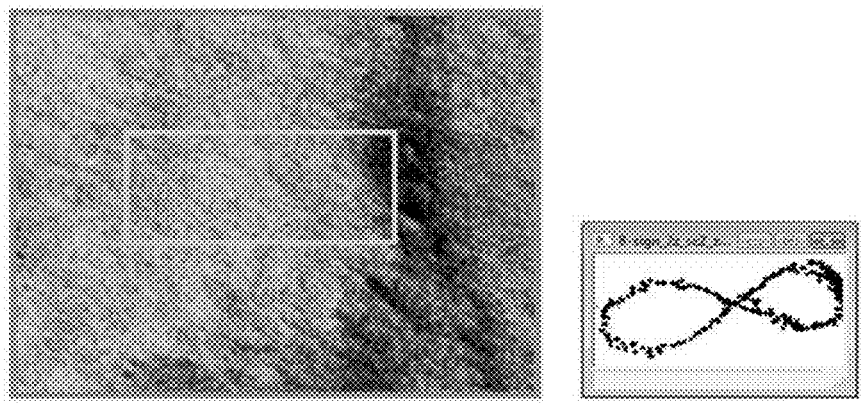
Fig.8. Original

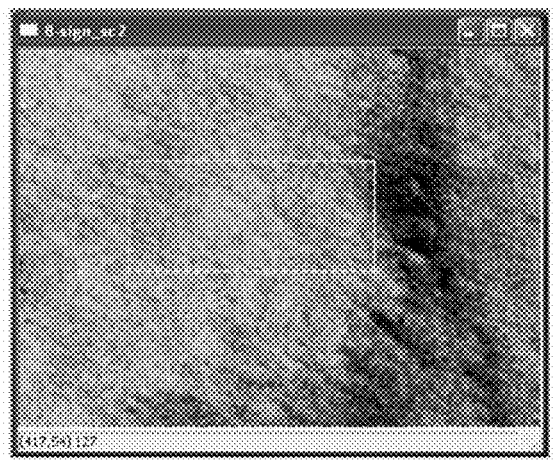
Fig.9. Joint Binary ACT and SAR Image Matching
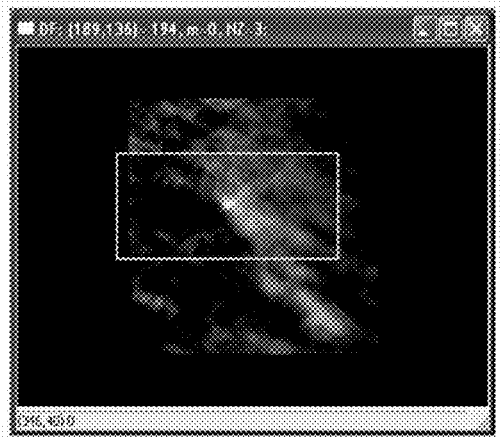
Fig.10. Figure-8 Pleogram
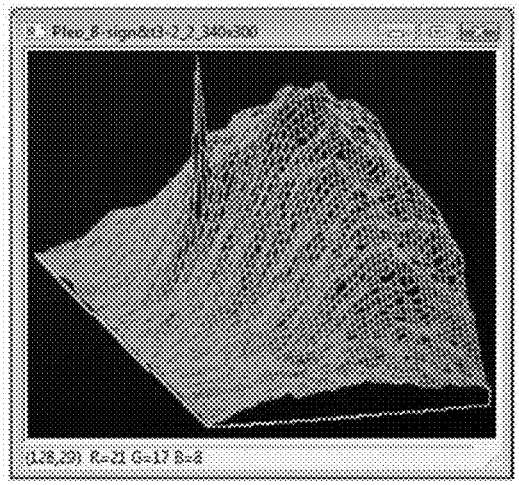
Fig.11. Figure-8 Pleogram

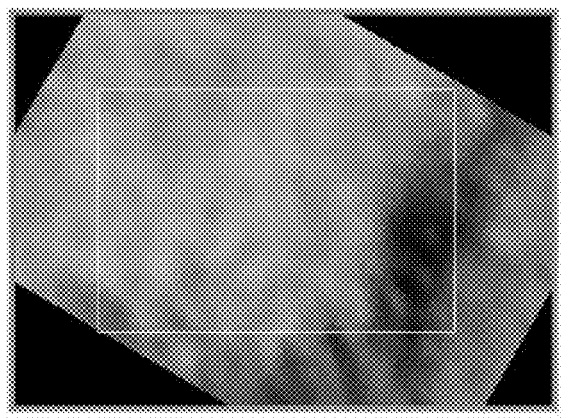
Fig. 12. Distorted Observed Image
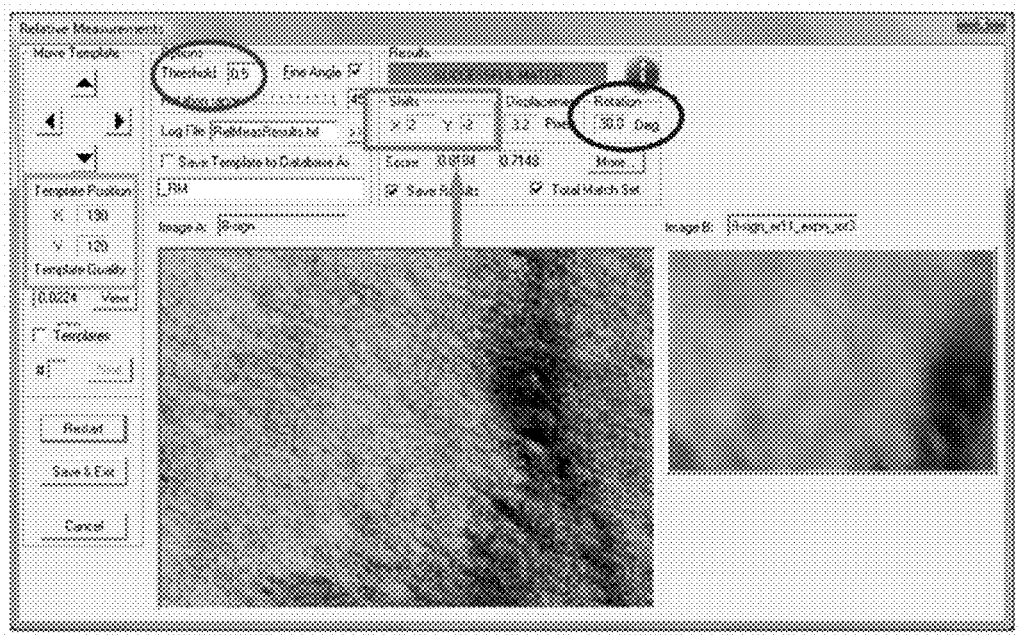
Fig. 13. (EXAMPLE) Matching Results for Original and Distorted Images

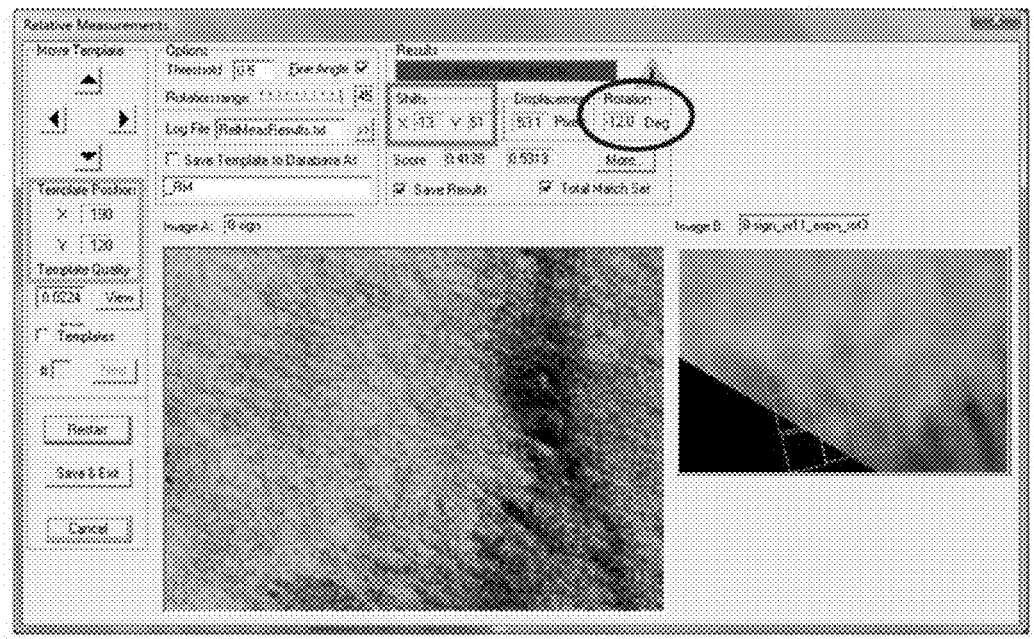
Fig.14. (EXAMPLE) Matching Results for Reference and Background Images
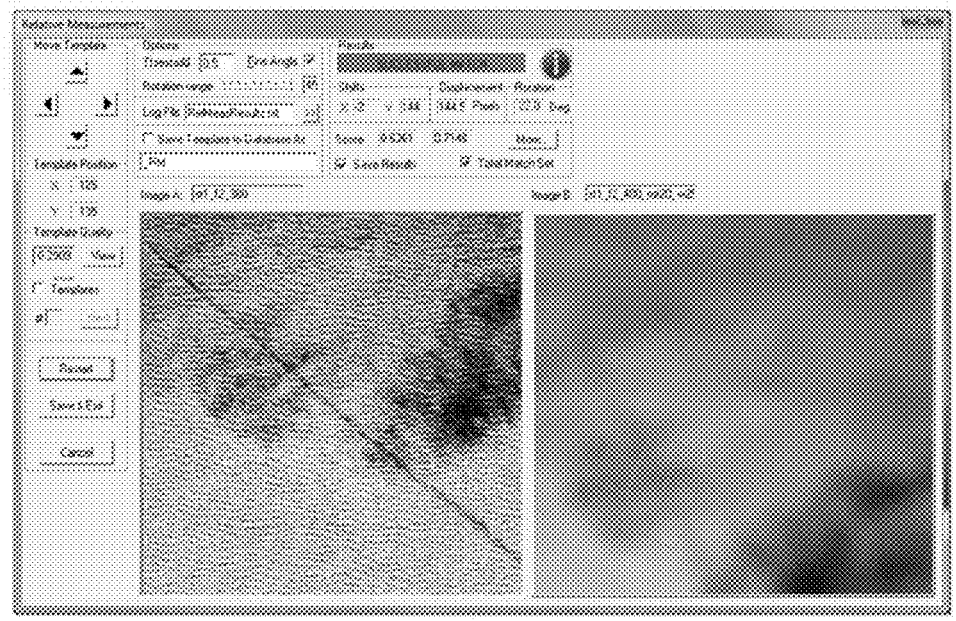
Fig.15. Linear Trace Matching

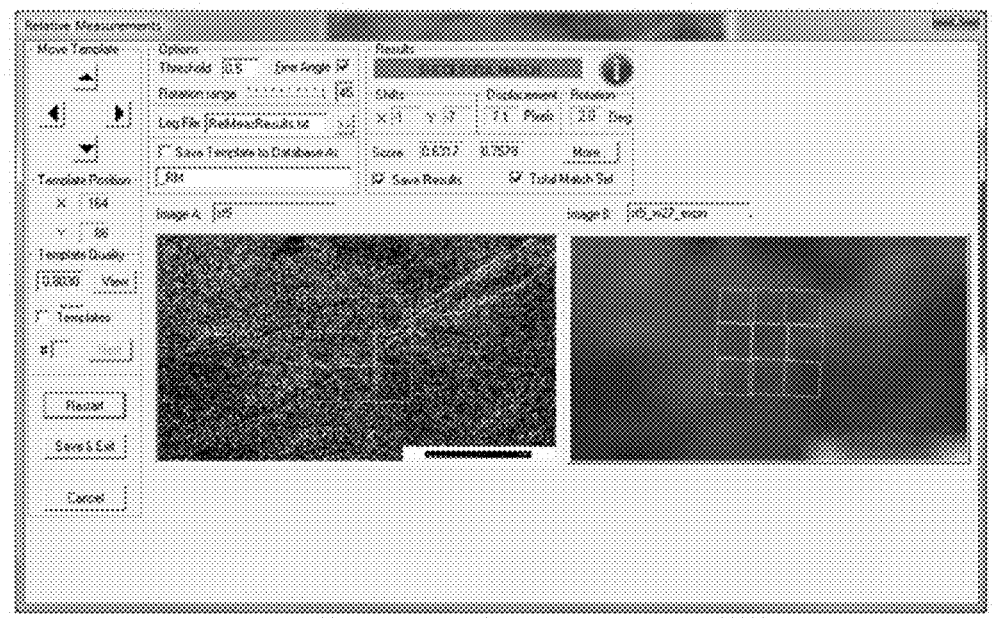
Fig.16. V-Shaped Trace Matching
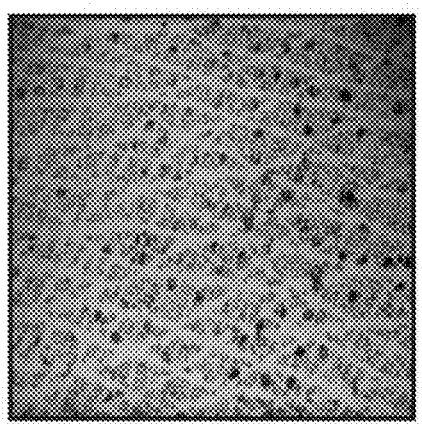
Fig.17a. Reference Wristprint
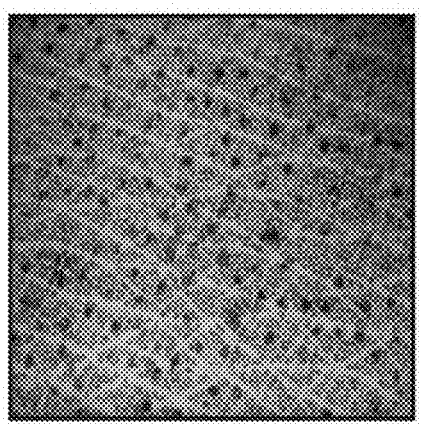
Fig.17b. Input Wristprint

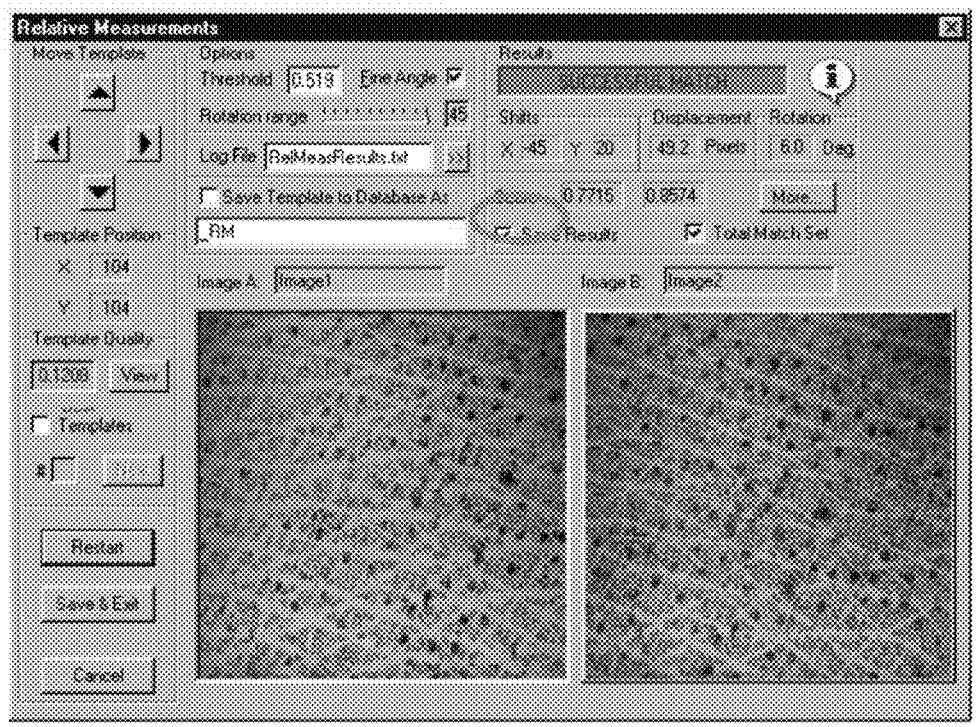
Fig.17c. Joint Wristprint Matching
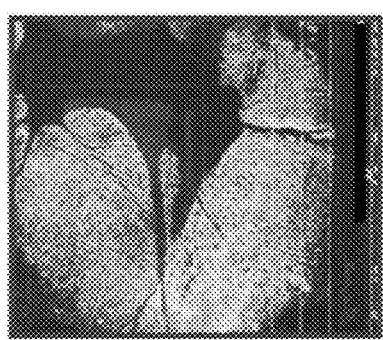
Fig.18a. Reference Image
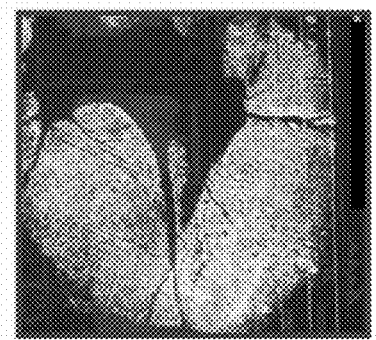
Fig.18b. Input Image

Fig.18c. Joint Raw Palmprint Matching
Fig.19a. Variance Field Patterns

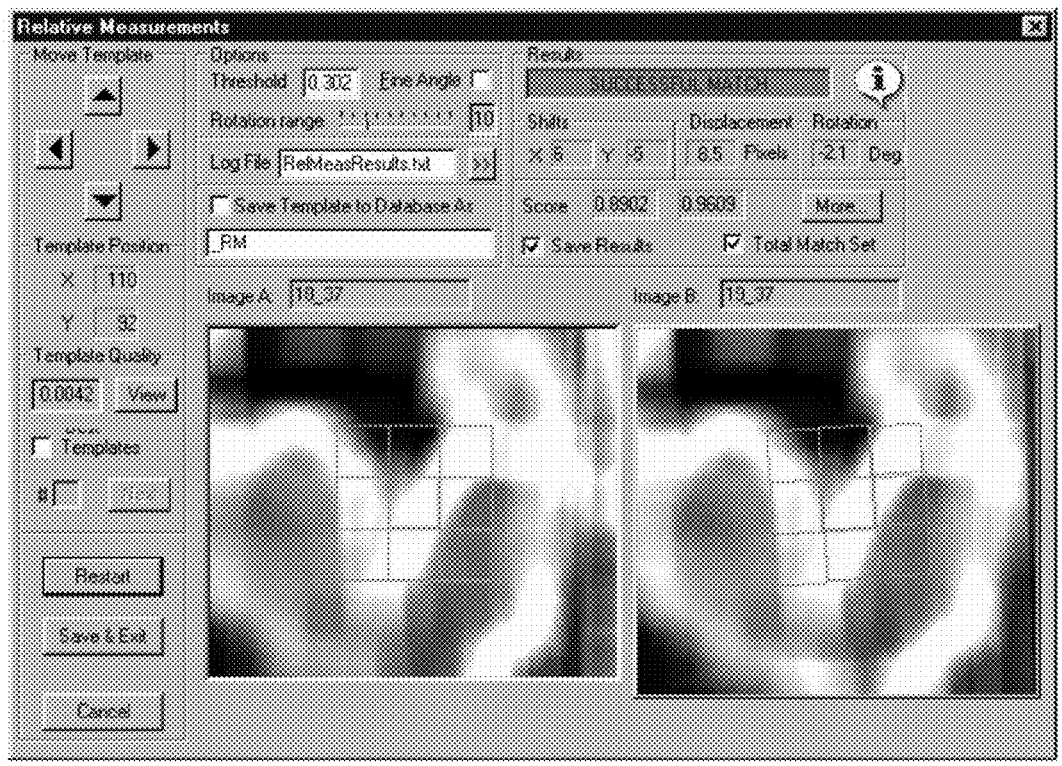
Fig.19b. Joint Matching of Variance Field Patterns
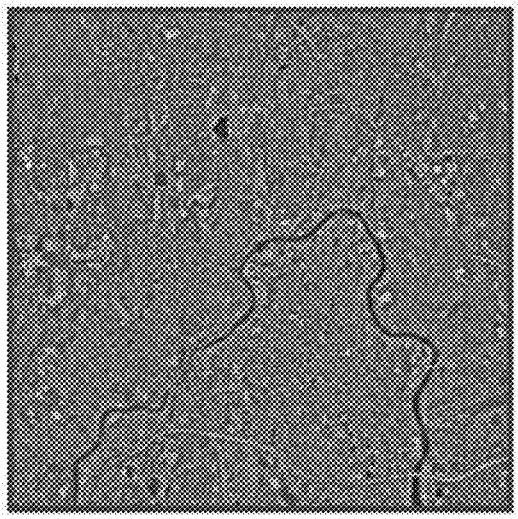
Fig.20. Reference Image
Fig.21. Input Image

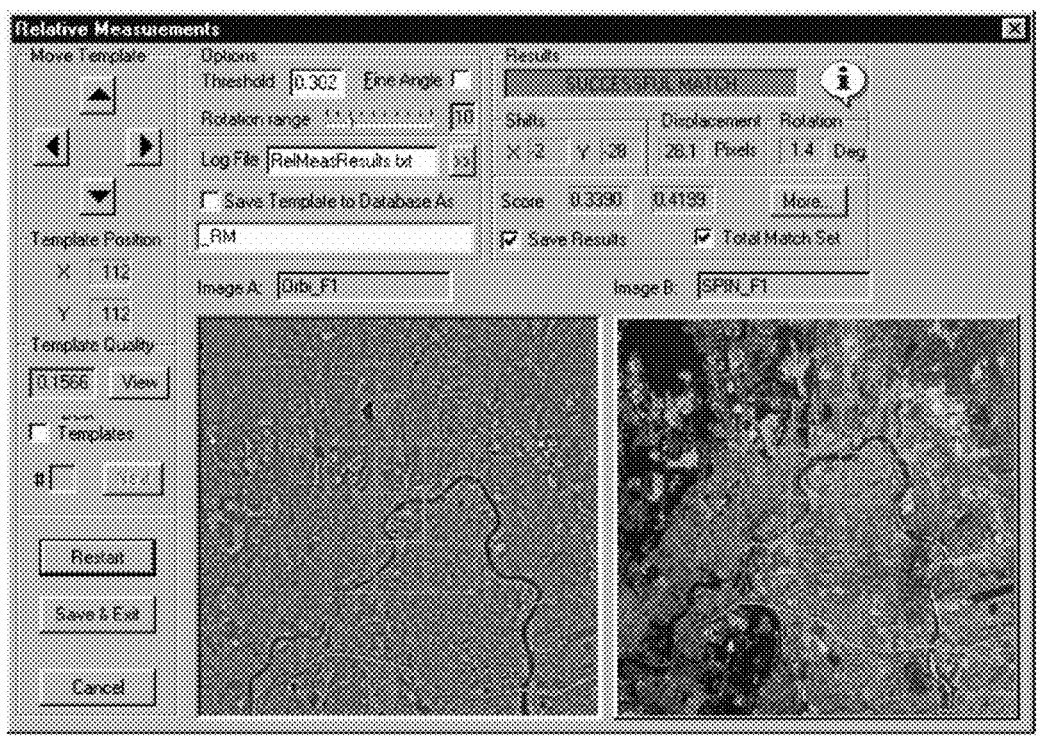
Fig.22. Joint Matching of Space Observations
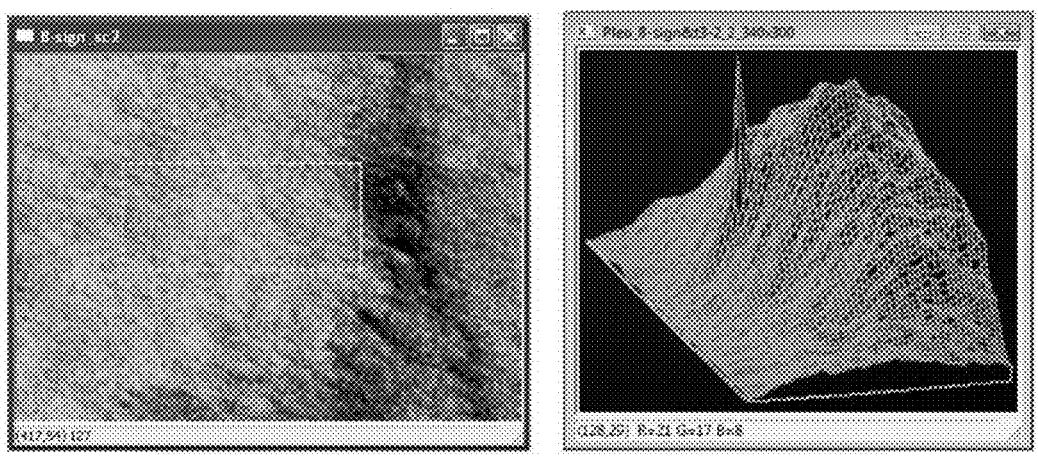
Fig.23. Submarine SAR Image Matching and Pleogram Relief

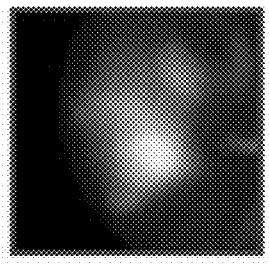 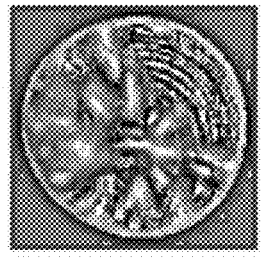 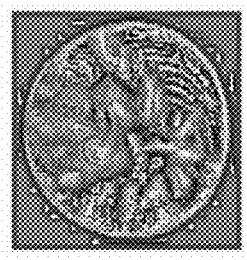
Fig.24. Input Pathology Image    Fig.25. Tumor Sight after Preprocessing    Fig.26. Reference Image Infiltrating Ductal Carcinoma

SYSTEM AND METHOD FOR PLEOGRAPHIC RECOGNITION, MATCHING, AND IDENTIFICATION OF IMAGES AND OBJECTS

CROSS REFERENCE TO RELATED APPLICATIONS

The present patent application claims priority from the commonly assigned U.S. Provisional Patent Application Ser. No. 61/191,836, entitled "SYSTEM AND METHOD FOR PLEOGRAPHIC RECOGNITION, MATCHING, AND IDENTIFICATION OF IMAGES AND OBJECTS", filed Sep. 12, 2008.

FIELD OF THE INVENTION

The present invention relates generally to data processing systems and methods for automatic recognition of images and objects, and more particularly to a system and method for recognizing, matching, and/or identifying images and/or objects utilizing at least one novel pleographic data processing technique.

BACKGROUND AND SUMMARY OF THE INVENTION

Image analysis techniques are utilized in a vast array of everyday applications ranging from consumer systems to industrial, scientific, medical, law enforcement systems and solutions. However, current image analysis systems suffer from many disadvantages and drawbacks.

The inventive data processing system and method advantageously provide a number of scalable novel image/object recognition and processing techniques that are capable of dramatically improving the efficacy, reliability, and accuracy of conventional and future surveillance, detection, identification, verification, matching, navigation, and similar types of systems utilizing image acquisition/analysis of any kind. Moreover, the use of the novel data processing system and method of the present invention, advantageously provides unequaled levels of tolerance to degradation in quality, decrease in available portion, increased noise, and variation in positioning and/or orientation in the images being analyzed as compared to the corresponding reference image(s).

The techniques of the inventive data processing system and method are especially effective under conditions of strong, real-time limitations, shock/vibration overloading, atmospheric noise, arbitrary signal distortions, etc., because they rely on utilization of a newly developed novel type of spatial response surface functions, hereinafter referred to as "pleograms", that are unique for each initially observed image, and that are later used for further matching thereto. Due to their inherent redundancy, comparable to holographic-based measurements, pleograms are extremely informative and stable. As a result of this property, utilization of pleograms in image analysis (e.g., identification, recognition, matching, etc.) applications creates an environment that is practically immune to strong signal/image distortions, arbitrary noises, etc., thereby providing, a high level of reliability in comparison to conventional raw image matching. Moreover, the novel pleographic approach is based on 3-dimensional object identification procedures that have substantially higher discriminative power than previously known image analysis techniques. The novel techniques based on the inventive pleographic approach and method provide, in particular, measurement accuracy and factual continuity due to an efficient data restoration between discrete reference points that results in higher effective resolution. The novel pleographic technique also meets the criteria of the minimal mean risk of real-time decision-making and is readily suitable for actual implementation including by way of simple real-time computations.

In summary, the novel pleographic image analysis (PIA) system and method of the present invention, include, but are not limited to, the following distinct unique features and advantages over previously known solutions:

Utilization of all available information about the observations and utilizes this information for full likelihood estimate, No specific assumption regarding the noise distributions are required—any arbitrary random distortions are admissible for statistically optimal algorithm synthesis, Significant tolerance to imperfect images and conditions—the matching reliability remains satisfied even if the images are strongly damaged Mere pipeline computations that provide high speed processing The technology can be deployed in a variety of platforms The inventive PIA system and Method are advantageous in a wide variety of commercial applications such as bio-medical diagnostics support, biometric access control, law enforcement, security, navigation, etc. In inventive PIA system and method are also particularly effective in military applications, such as automatic target detection (ATD), automatic target recognition (ATR), synthetic aperture radar (SAR), and so on. In such applications, the use of novel PIA techniques substantially increases the reliability/accuracy of target identification, increases the noise-stability, reduces processing time, and lowers the minimum requirements of the sensors and images captured in the course of system operation.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference characters denote corresponding or similar elements throughout the various figures:

FIG. 3A shows a diagram of exemplary utilization of a pleographic response function in connection with comparing a reference image to an observed image during utilization of the inventive pleographic image analysis system of FIG. 2A;

FIG. 3B shows a diagram of exemplary formation of a reference image and a corresponding pleogram, during the operation of the inventive pleographic image analysis system of FIG. 2A; and FIGS. 4 to 26 show various exemplary images, corresponding templates and exemplary user interface screens of various embodiments of exemplary data processing systems utilizing the inventive pleographic image analysis system of FIG. 2A.

DETAILED DESCRIPTION OF PREFERRED EMBODIMENTS

The data processing system and method of the present invention remedy the disadvantages of previously known image analysis solutions by providing a platform-independent image analysis system architecture and technology platform comprising a plurality of sealable novel image/object recognition and processing techniques that are capable of dramatically improving the efficacy, reliability, and accuracy of conventional and future surveillance, detection, identification, verification, matching, navigation, and similar types of systems utilizing image acquisition/analysis of any kind. Moreover, the use of the novel data processing system and method of the present invention, advantageously provides unequaled levels of tolerance to degradation in quality, decrease in available portion, increased noise, and variation in positioning and/or orientation in the images being analyzed as compared to the corresponding reference image(s). Advantageously, the novel system and method utilize a revolutionary "pleographic" image analysis approach, that is based on 3-dimensional object identification procedures that have substantially higher discriminative power than previously known image analysis techniques, and that provide many additional advantages.

The inventive pleographic image analysis (PIA) system and method, is also modular, and may include at least a portion of the following analytic "modules", as part of its multi-level structure:

a) semi-empirical algorithms used as a rule for linear objects;
b) statistical binary algorithms used in Biometrics and for other physical black-and-white nature objects;
c) Distribution-Free Estimation (DFE) non-parametric algorithms;
d) optimal Maximum Likelihood Estimation (MLE) algorithms;
e) quasi-optimal zonal MLE algorithms; and/or
f) 3D pleographic algorithms.

As is noted above, the novel PIA technique improves the efficacy the of any observation, identification, and verification system, and, when implemented in an appropriate image analysis system, is capable of substantially increasing image identification reliability/accuracy, reduce system processing time, and lower minimum requirements for analyzed images in the course of system operation.

Figure 1A:
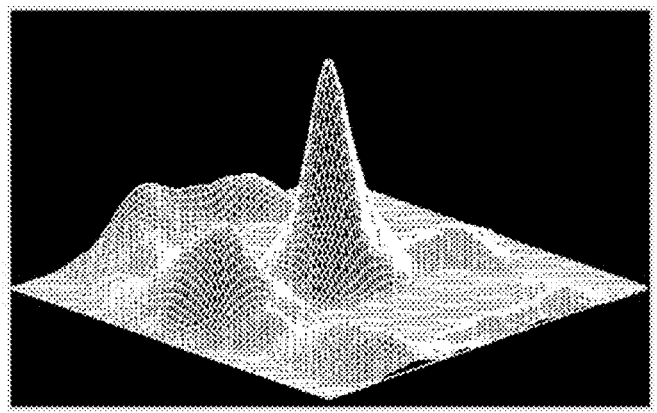
FIG. 1A shows a diagram of a 3-D pleographic response function generated in accordance with various embodiments of the inventive pleographic image analysis technique.

Essentially, the core novel PIA technique employs a new image comparison approach based on a 3-dimensional object identification procedure that comprises replacement of conventional "image-to-image" matching, with "surface-to-surface" identification, that inter alia provides higher reliability and accuracy when compared with traditional approaches. PIA technique image matching utilizes a novel type of response functions called "pleograms", such as shown, by way of example, in FIG. 1A, hereof, and is preferably conducted in accordance with a dynamically determined threshold that is individually tailored for the reference image during a prior enrollment stage. As is discussed in greater detail below, the novel PIA technique provides, in particular, a high degree of measurement accuracy and factual continuity due to an efficient data restoration between discrete reference points that results in a practically infinite resolution.

Prior to describing the various embodiments of the inventive PIA techniques, it would be useful to provide an overview of the analytic and algorithmic background thereof. At the outset, it should be noted that the various embodiments of the PIA technique meet the general statistical criterion of Bayesian Mean Risk and in most situations can be reduced to Maximum Likelihood Estimates (MLE)—an overview of these principles and related factors is provided below:

Optimal decision making: The most general mathematical approach to making the best possible decisions based on a given collection of input data is known as the minimum risk method. For simplicity, we henceforth consider its special case referred to as the maximum likelihood method.

The observed input data is supposed to be a set of random variables, d ($d_1$, $d_2$, . . . ). The distribution of each variable $d_i$ depends on the adopted hypothesis H about the actual origin of the input data: $f(d_i)=f(d_i|H)$. A typical hypothesis might be formulated as "H: This data was produced by the template pattern #1." The total distribution of the entire data set is thus also conditional with respect to the adopted (or tested) hypothesis: $f(d)=f(d|H)$. The maximum likelihood method consists in calculating the conditional probabilities of the observed data set that correspond to all admissible hypotheses, i.e., $f(d|H_i)$, i=0, 1, . . . , M, and then deciding in favor of that hypothesis which yields the highest conditional probability.

The typical pair of hypotheses in an identification system "$H_0$: This data belongs to by the template pattern #1" and "$H_1$: This data does not belong to by the template pattern #1". In this case, the system accepts hypothesis $H_0$ only if its probability greatly exceeds that of its alternative, $H_1$. To this end, the system establishes as decision threshold with which it compares the ratio of these two probabilities. If this likelihood ratio exceeds the threshold, a positive decision is taken: otherwise, the hypothesis is rejected. This condition can be written as $$L(d) = \frac{Prob(H_0|d)}{Prob(H_1|d)} = \frac{Prob(H_0|d)}{1-Prob(H_0|d)} > T, \quad (1)$$

where d is the data set and T is the threshold.

Mean Risk Estimate and 3D Response Function Matching. As is noted above, it is well known that the most general criterion in hypothesis testing is the Bayesian mean risk $$R(H|Z) = \sum_v C(H|H_v)P(Z|H_v)P(H_v) \quad (2)$$

where $C(H|H_v)$ is the loss function, defining the loss upon accepting hypothesis H if the actually valid hypothesis is $H_v$; $P(Z|H_v)$ is the a posteriori probability that the observation Z originates from hypothesis $H_v$; $P(H_v)$ is the a priori probability to observe hypothesis $H_v$.

Usually, the a posteriori probability is calculated based on the true distributions, which are available only in the simplest cases. However, it could be shown that for the wide range of observed images an analytical high-precision approximation method might be built defining as work density f(z), where z—some vector-image with independent components. In this case the logarithmic maximum likelihood function for multidimensional probability $P(Z|H_v)$ may be written as a sum of one-dimensional functions $$\phi(z) = \sum_\mu \varphi(z_\mu) \qquad (3)$$

$$\varphi = \ln f \qquad (4)$$

reducing the procedure to the summation of independent contribution from all pixel pairs over images.

Figure 1B:
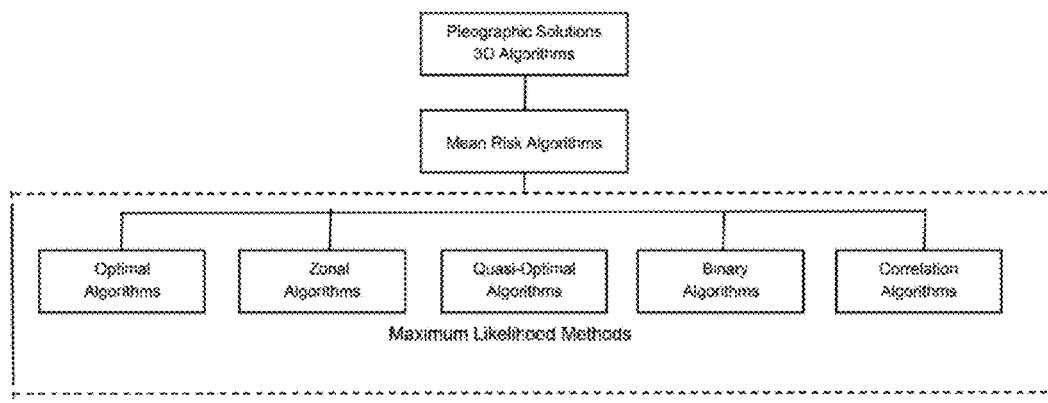
FIG. 1B shows a block diagram of an exemplary hierarchical infrastructure for optimizing the implementation of various embodiments of the inventive pleographic image analysis technique in an image analysis system.

Referring now to FIG. 1B, in preferable practice, the novel PIA technique may be implemented in a technical solution having a hierarchical structure in which pleographic (i.e., PIA) solutions, are 3D generalizations of traditional statistical estimations to provide the highest Algorithm Discriminative Power (ADP). The PIA-based algorithms are highly suited to the most challenging observation cases under conditions of strong image distortions including random noise, speckle, arbitrary rotations and stretches, poor resolution, low contrast, etc.

In cases where statistical features of the images under observation are known, optimal algorithms are synthesized on the basis of an acting measurement distribution and associated numerical parameters or their estimations. If an analytical representation of the distribution is unknown but some reasonable assumptions regarding noise character—additive, multiplicative, etc—can be made, adaptive zonal algorithms must be used. They are designed on the basis of homogeneous zone selection and a procedure that provides high ADP. For completely uncertain random measurements, self-learning quasi-optimal algorithms are applicable and their creation requires a teaching step.

For some specific measurements with a dual-zone physical nature, binary algorithms provide the highest ADP. Correlation algorithms are applicable for sea surface imaging and are optimal in the case of Gaussian (normal) distributions of observations. Although normal distributions are rarely met in the cases of interest, empirical utilization of correlation algorithms can also potentially provide useful results.

All image recognition (and related image analysis) algorithms work as decision-making procedures that are each based on a so-called corresponding "Response Function" (RF). The inventive PIA technique employs a novel global image comparison process that first acquires a reference image during an enrollment stage, and then forms a corresponding "comparison" surface RF relief, comprising of multiple reference segments from the reference image. Later during an identification stage, the algorithm forms the similar RE surface over the identification image, and then compares all pixels-to-pixels of the reference RI surface enclosed. Matching runs in accordance with a dynamically determined threshold that is individually tailored for the reference image during the enrollment stage. When the threshold is exceeded, the identification image is considered identified; otherwise identification is rejected. The method includes the capability of determining multiple most likely positions for the multiple reference RF segments over the identification image. Such an approach based on 3-dimensional RF surface comparison has been developed for the first time.

Experimentation has demonstrated that the aforementioned novel pleography technique is proving particularly effective in highly-challenging recognition cases. Technique consists of construction of multi-dimensional response surfaces—pleograms—that will be firmed for each analyzed image and are used for its further ID. Due to inherent redundancy, pleograms are extremely conservative and stable making this technique practically immune to strong image distortions and providing highest ID reliability when compared to raw image matching. Response function forms a 3D surface that look like a mountain terrain relief Its typical picture is shown on FIG. 1.

Figure 2A:
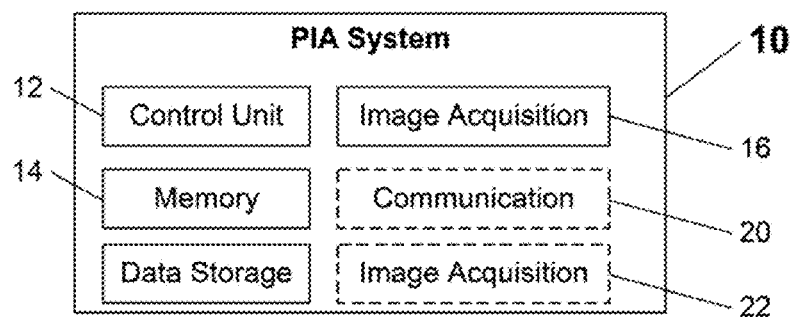
FIG. 2A shows a block diagram of an exemplary embodiment of an inventive pleographic image analysis system of the present invention.
Figure 2B:
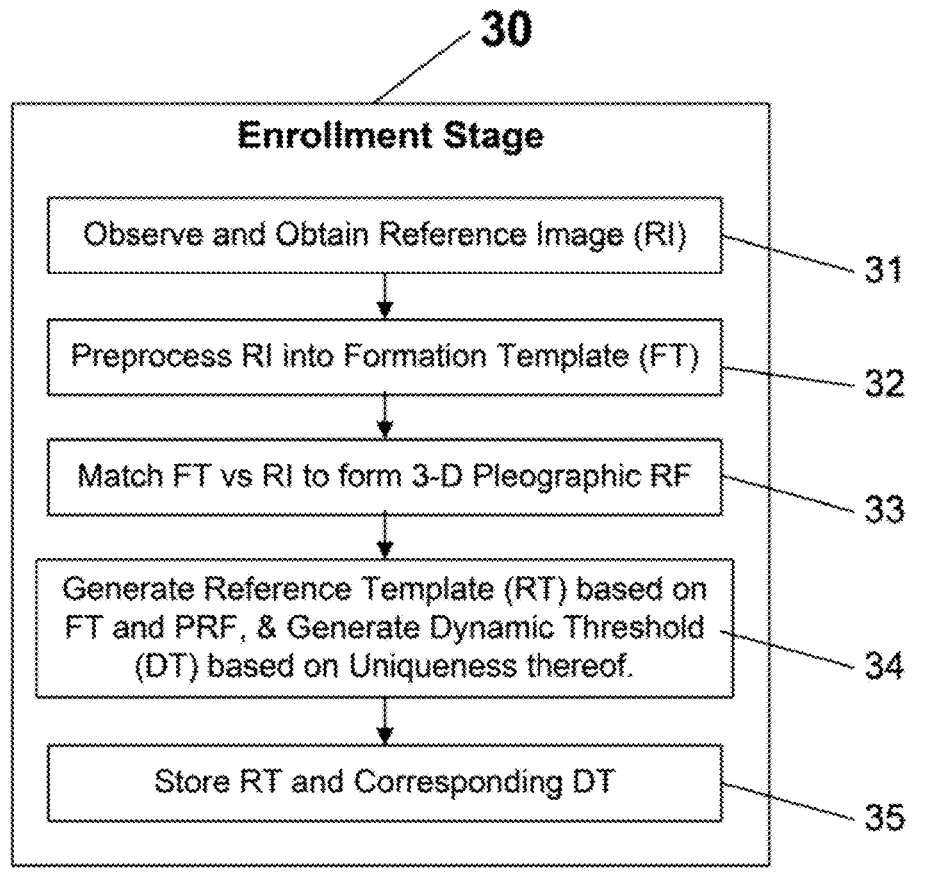
FIG. 2B shows logic flow diagrams of exemplary processes of enrollment and analysis stages of operation of the inventive pleographic image analysis system of FIG. 2A.
Figure 2B:
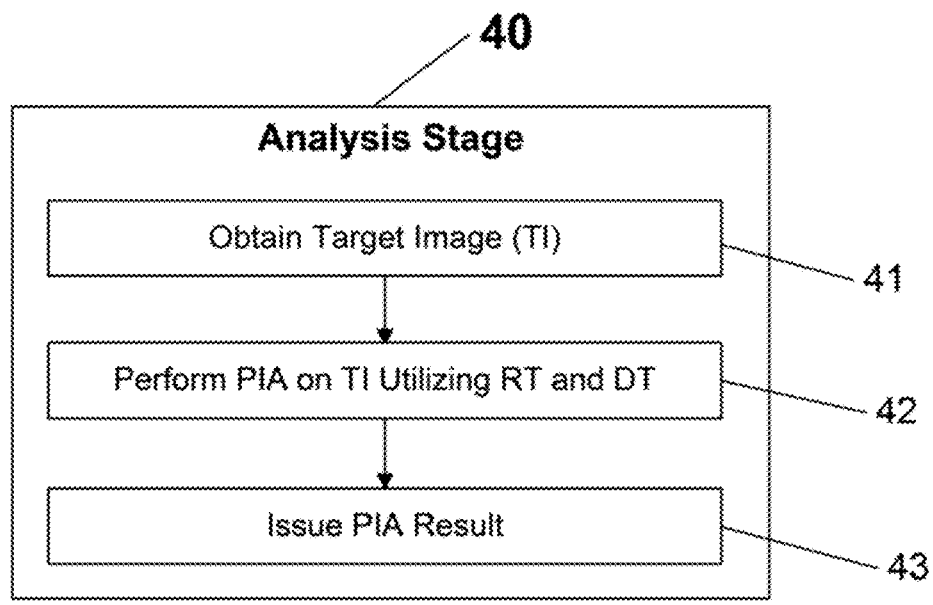

Referring now to FIGS. 2A and 2B, the PIA system 10 operates in two separate stages—a Template Formation (Enrollment) stage 30 and a Template Identification (Recognition) stage 40. The system 10 includes a control unit for executing an enrollment control program during the enrollment stage and executing a identification control program during the recognition stage, a memory for storing data and the control programs, an image acquisition system for acquiring reference and identified image and other components.

Throughout the enrollment stage, a reference image is observed and obtained. The reference image is then filtered and preprocessed into a formation template (FT. After that, the control program matches the FT against the same reference image forming 3D surface of Response Function. A dynamic threshold is tailored as a function of uniqueness of the reference template. An exemplary process of reference image formation is illustrated in FIG. 3B.

The majority of image recognition algorithms work as decision-making procedures based on so-called Response Function (RF) analysis. Referring now to FIG. 3A, the location of the extreme RF value (or level) defines a true matching point on reference image 52 and the observed image 50. The inventive PIA methodology, employs a novel image recognition approach where the algorithm forms an array of RF values from the reference image 52. Plotting of this RF array, creates a 3D surface that looks like a mountain terrain relief where each point is the RF level for given X-Y coordinates on the image—the pleogram and, correspondingly, the reference pleogram 54 for the reference image 52. At the recognition stage for the observed image 50, the algorithm forms a RF surface/pleogram to be compared with the reference pleogram 54.

For the verification task, the image and the extreme value from MLE, is taken as a true match point. For the detection task, the MLE peak is be compared with the given threshold. When the threshold is exceeded, the target is considered captured, otherwise the identification is rejected.

This innovative pleographic approach, that replaces "image-to-image" matching by "surface-to-surface" comparison, brings significant advantages. Each pleogram level is obtained as a result of separate pixel matching contributions and strong neighbor/area fragment overlapping so these surfaces tend to be much more stable than raw images. Hence, an image recognition procedure based on the novel PIA technique will provide higher reliability and accuracy as compared to traditional approaches. Such a technique should withstand very powerful distortions such as image damages, rotations, speckle, geometric distortions, overall image amplitude trend, among others.

3-Dimensional RF Identification Throughout the identification stage, in the course of scanning an input image of image formation is obtained. On its base a new 3D template is formed absolutely in the same way as it was done on the enrollment stage, and the program matches this against the input image, forming a new RF surface. The control unit then retrieves the reference RF surface (see FIG. 3), matching this against the new RF surface of the observed image to determine at least one best match position. It results in some secondary RF surface (see FIG. 4) obtained as "surface-to-surface" joint matching that should possess a narrow and high RF peak. This, in turn, certainly provides the object identification high reliability and accuracy.

If the dynamic threshold is exceeded, the input image is considered identified; otherwise identification is rejected. To speed up the determination of the best match positions, the observed image and the reference template may be temporarily coarsened by a predetermined factor. Optimal statistical algorithms for the reference and observed RF surfaces joint matching has been developed, simulated and tested on the base of real-world images.

A number of previous results, designs, and applications result in creation of a quite new multi-dimensional approach and method based on the spatial response function use and possessing a perfectly different reliability—these functional surfaces are very informative and conservative due to high redundancy gained in their every pixel. Moreover, it is not an abstract theory; first, we use most part of its particular algorithms already; secondly, as it frequently happens, not a simple and even sophisticated enough approach leads to pretty mere computational procedures highly stable versus various distortions, for instance, strong image deteriorations. This approach is applicable to any physical objects, not images only: there are no any serious restrictions to the technique utilization.

In terms of biomedical image ID, it means that even strong image quality lowering does not lead to any noticeable reduction of the method discriminative power; it works for any possible images and not only images. In very deed, it results in novel science direction, new technological and technical solutions. Although its physical basics are quite different, its philosophical analogy is holography—from Greek 'holos'—'whole'—where all signal parameters (amplitudes and phases) are recorded "in whole". This technique was named as 'pleography' from Greek 'pleonasmos', 'pleonazon'—'redundancy', 'redundant', and obtained surfaces as 'pleograms'. In the same manner as for holograms, deleting of a tangible original information part (contrast, brightness, even entire image areas) does not get the pleogram-based decision to a fatal mismatch.

Image Recognition Algorithms

Let the dimensions of observed image z be M×N pixels, those of the reference a m×n pixels, with M>m and N>n. Then the number of possible positions of a on z is (M−m+1)×(N−n+1). The task of a recognition procedure is then to test each of the (M−m+1)×(N−n+1) hypotheses concerning the matching location of a and select the one corresponding to the highest similarity between a and the respective z fragments.

The general recognition procedure, understood as hypothesis testing, can be formulated as follows. The measured image z is compared by a certain rule with the reference a. This comparison yields a quantity φ that is a measure of similarity between two images. After all the hypotheses have been tested, a two-dimensional field φ is obtained. The global extremum of this field is the point of highest similarity. The magnitude φ is called as the decision function (or response function, mentioned above).

In the framework of the statistical approach, the decision function is constructed from the posterior probability P(z|a) corresponding to the event that the signal z is actually the reference a affected by noises. If the statistics of noise is known this allows one to derive liar each particular case an optimal recognition procedure.

Imaging devices are usually designed so that the noise can be assumed to be independent in different image pixels (at most, there may exist some correlation between immediate neighbors that can be disregarded without much loss of estimate accuracy.)

If the assumption about noise independence is valid, the multidimensional probability P(.|.) becomes a product of one-dimensional functions:

$$P(z \mid a) = \prod_\mu f(z_\mu \mid a_\mu) \qquad (1)$$

where $z_\mu$, $a_\mu$ are the brightness values in the μth pixel of the respective image. For the sake of computational convenience, this expression is usually replaced, by its logarithm $$\phi(z \mid a) = \sum_\mu \varphi(z_\mu \mid a_\mu) \qquad (2)$$

$$\phi = \ln P \qquad (3)$$
$$\varphi = \ln p$$

reducing the procedure to the summation of independent contributions from all image pixel pairs. It may be shown that the image pixel intensity z also undergoes unknown variations with power α. After the transform $$\zeta = b\left(\frac{z}{b}\right)^\alpha \qquad (4)$$

new magnitude ζ is distributed as $$f(\zeta \mid b, L, \alpha) = \frac{L^L}{\Gamma(L)} \frac{\alpha}{b} \left(\frac{\zeta}{b}\right)^{\alpha L - 1} e^{-L\left(\frac{\zeta}{b}\right)^\alpha} \qquad (5)$$

The distribution obtained here will be called as generalized Weibull density (GWD); Weibull had considered its simplified form for reliability engineering.

The generalized Weibull density (GWD) moments are defined as $$\langle \zeta^r \rangle = \frac{b^r}{L^{r/\alpha}} \frac{\Gamma\left(L + \frac{r}{b}\right)}{\Gamma(L)} \qquad (6)$$

Now the distribution (5) may be used as a density in (2) or, more exactly, logarithm of (5) in (3). Then (2) transforms to $$\phi(z \mid a) = -\sum_\mu \left[\left(\frac{z_\mu}{a_\mu}\right)^\alpha + \ln\left(\frac{z_\mu}{a_\mu}\right)^\alpha\right] = \max \qquad (7)$$

Thus, the RF value can be directly found for the set of all pixel of the observed image z, reference image a, and pre-calculated α.

Statistical Comprehension of GWD

The GWD spreads all over a large number of real-world situations. For instance, for the particular case of α=1 it transforms to the Laplace distribution that typical for the electromagnetic power statistical description:

$$f(\zeta \mid b, L, 1) = \frac{L}{\Gamma(L)} \frac{1}{b} \left(\frac{\zeta}{b}\right)^{L-1} e^{-L(\frac{\zeta}{b})} \qquad (8)$$

For α=2 the GWD becomes the Raleigh distribution applicable for electromagnetic amplitudes:

$$f(\zeta' \mid b, L, 2) = \frac{L}{\Gamma(L)} \frac{2}{a} \left(\frac{\zeta'}{a}\right)^{2L-1} e^{-L(\frac{\zeta'}{a})^2} \qquad (9)$$

$$\zeta' = \sqrt{\zeta}, \quad a = \sqrt{b}.$$

For α=2, L=½, b=σ, ζ>0 the GWD coincides with the normal distribution mentioned above in conjunction with incoherent systems:

$$N(\zeta \mid \sigma) = \frac{1}{\sigma\sqrt{2\pi}} e^{-\frac{\zeta^2}{2\sigma^2}} \qquad (10)$$

And, finally, for α=1 and L=α and after a linear substitution $$x = L\frac{\zeta}{b}$$

the Gamma density occurs:

$$G(x, a) = \frac{1}{\Gamma(a)} x^{a-1} e^{-x} \qquad (11)$$

Thus, the GWD use provides the statistical description for most of the practically interesting cases in imagery.

Experimental Data

The basic response function (RF) surface approach consists in the inherent surface property use Indeed, each function (3) level obtains as a result of strong neighbor hypotheses overlapping so these surfaces are much more stable and conservative than raw images. Hence, an image recognition procedure based on "RF surface identification" should provide highest reliability and accuracy in comparison with traditional approaches.

Space Observation Recognition

This approach is quite applicable to aerospace observations. Let us consider two radar image of NJ (the Passaic River area), received, from different satellites, Orbimage and SPIN-2, FIG. 20 and FIG. 21.

Images are slightly shifted one another but they comprise mutual areas. Despite the diet that images look quite different, the 3D RF-based fragment recognition is absolutely right, see FIG. 22. Practically, there are no any restriction regarding image origination and this method usage.

CONCLUSIONS

The inventive PIA. System and Method are aimed at optimizing the performance of identification systems, and comprise at least the lowing basic features that are advantageous over, and distinct from, previously known solutions, systems and methodologies:

Feature independence: Matching is carried out between two images in their entirety, rather than between some specific shapes, or features, detected in the images. This approach has at least three significant advantages:
 all available information contained in the images is fully utilized
 no extra errors resulting from incorrect feature detection can occur
 the absence or presence of any particular shapes in the images has no influence on the result Ability to stand severe image distortions: The technology works well even when the input image is degraded by various distortion factors such as noise, surface pollution, bruises, etc., Ability to jointly use dissimilar image features: the input data mix may include multiple image areas, all such information pieces complementing each other and comprising a highly redundant data set.

Compatibility with existing cameras/readers: the technology has been successfully tested on from-the-shelf market sensor products.

These features make this technology the best in its class with respect to the attainable error rates and the scope of applications. The technology provides a uniform framework for implementing a wide variety of observation/identification systems customized each for its particular application.

The technology is superior to others in that it allows one to employ any amounts of input data, including physically dissimilar measurements, which practically removes the limitation on the attainable FAR and FRR values.

At the same time, a high degree of redundancy requires the corresponding processing time. An obvious solution is to retain only the most typical and small-sized shapes in the image, discarding all the rest. This approach gave rise to various skeleton techniques, including reference point algorithms. In fact, that was the usual contradiction between the necessary data amounts and the need to process them in a very limited time. In inventor employing advanced mathematical techniques, was able to solve the contradiction mentioned above. The algorithms and software can process huge amounts of data in just a fraction of a second. This is accomplished with the aid of sophisticated pipeline procedures and compact storage of the reference data.

Exemplary PIA Utilization

A PIA exemplary procedure is the so-called zonal model of a terrestrial and sea surface images. Usually, the Earth's surface contains extended regions in which the surface reflectivity is approximately uniform. This is due to the same physical nature of surface cover in the region (grass, forest, open soil, water, rough sea, flat sea, and so forth). Such regions are usually shown in maps, making it possible to use maps for preparing references. Such regions will be called homogeneous zones.

Homogeneous Zone Selection

An observed wake is shown in FIG. 4 as an example of a maritime image with a V-shaped structure. In order to form a reference object, this image should be broken down into homogeneous zones. Since there is only one structure of interest the wake to be selected—two homogeneous zones should be identified: the "wake" zone and "non-wake" zone. See—FIG. 4. Reference Wake Radar Image A special selecting procedure locates the wake pattern in the top-left location on the original image (indicated by the yellow square). After this reference area is extracted (FIG. 5), a zoning algorithm breaks down the selected fragment into two homogeneous zones developing an Area Coded Template (ACT).

See FIGS. Reference Area and Area Coded Template

The same procedure can be applied to the low-contrast figure-8 images shown below in FIG. 6; the figure-8 signature is located within the yellow rectangle where the white dashed lines show signature axes. The same image, pre-processed to increase contrast, is shown in the image on the right in FIG. 6.

See FIG. 6. SAR. Figure-8 Signature image (left) and Pre-Processed Image (right)

After processing, the figure-8 ACT appears as shown in FIG. 7:

See FIG. 7. Figure-8 Signature ACT

The obtained figure-8 ACT accurately matches the original reference image. This template should be used further for recognition and identification purposes.

SAR Image Signature Recognition. Identification Reliability and Accuracy

The primary goal of the example presented here was to estimate matching feasibility for sea surface images as a part of Maritime Moving Target Identification (MMTI) solutions; mass statistical simulation was not the objective. Computational experiments have been carried out in four steps:

1. Image visual analysis
2. Automated program signature identification
3. Formation of randomly distorted observed images
4. Matching of observed images to their reference prototype The original figure-8 image from FIG. 6 (enlarged) is shown below in FIG. 8 where the visually observed signature area is indicated by the yellow rectangle. For further matching purposes, the ACT is turned into a clarified figure-8 binary template (FIG. 8):

See FIG. 8. Original (Reference) SAR Observed Image and Figure-8 Binary Template HMC proprietary algorithms and programs have been used for the automated signature match. The highest likelihood template position is selected by the program and shown by the yellow dashed rectangle in FIG. 9 below. As can be seen, the image fragment found by the program is the same one that was visually selected in FIG. 8.

See FIG. 9. joint Binary ACT and SAR Image Matching

The pleogram fir this matching process is shown in FIG. 10 (view from above) and FIG. 11 (isometric view).

See FIG. 10. Figure-8 Pleogram, FIG. 11. Figure-8 Pleogram

The extreme value on the pleogram is easily seen as a bright point in the grayscale MLE field (FIG. 10) and as a high and narrow peak on the pleogram relief (FIG. 11). In the course of matching, the binary ACT is moving along the reference image seeking its most likely location. The true figure-8 location immediately gives a strong response (pleogram peak) that provides high reliability: the peak has the narrow cross-section that delivers good accuracy. This result is very promising. Indeed, the figure-8 object on the reference image (FIG. 9) has an intermittent structure, low contrast with respect to the background, and is barely distinguished by the naked eye. Nonetheless, the applied algorithms and procedures have quite successfully identified the required signature location providing acceptable reliability and accuracy. This example supports the assertion that HMC proprietary software can be utilized to search, detect and classify the objects of interest to the proposed effort.

To further demonstrate the power of the proposed matching approach, observed images were modified using a statistical model that includes the following random and deterministic components:

Unknown gain
Receiver additive noise
Amplitude (brightness) fluctuations (speckle)
Contrast degradation
Geometrical stretch
Rotations Image pre-processing/improvement included procedures such as Overall Trend Removal (OTR), Linear Range Adjustment (LRA), Histogram Range Stretch (HRS), and others.

The figure-8 image has been distorted in correspondence with this model with the receiver additive noise variance $\sigma^2=128$ (entire pixel brightness range is [0, 255]; such a $\sigma^2$ value leads to strong useful signal suppression. The image was also rotated by 30 degrees and the contrast degraded. Exponentially distributed multiplicative speckle is clearly seen in the picture (see FIG. 12) like a grained structure. All together this makes the output image unrecognizable by the human eye.

See FIG. 12. Distorted Observed Image

The central part of the distorted area—shown by the white frame—has been extracted for further matching as an observed image. Matching was performed using HMC proprietary image processing software in Relative Measurement (RM) research mode. The RM interface and matching results are shown on FIG. 13. The Match Engine (ME) program selects a particular image area (green square set) on the reference Image A.

The selected fragment is being matched against the extracted observed image, Image B on the right. Image joint recognition is considered positive with the "SUCCESSFUL MATCH" outcome at the top of the screen in the "Results" box, if the matching Score (see green arrow in FIG. 13) is higher than a given Threshold value (circled in red). Otherwise recognition is considered as false and an "UNCERTAIN MATCH" outcome provided (FIG. 14). All scores are normalized to 1: the closer the score is to unity, the higher matching reliability. Additionally the program measures reciprocal Shifts and Rotation angles between images, and total Displacement.

As seen in FIG. 13, the observed image—despite strong distortions and noises—has been matched to the original one correctly. Deviation from the initial coordinates on the reference image (Template Position, X=190 and Y=120, indicated by cyan rectangle in FIG. 13) is small, only 2 and (−2) pixel reciprocal Shifts (shown by brown rectangle).

See FIG. 13. Matching Results for Original and Distorted Images

This shows our high accuracy and, due to a strong (~0.82) final Score, also high reliability. The 30 degree rotation angle has been measured with high precision as well (window Rotation in FIG. 13, circled in blue).

If the observed image fragment (Image B in FIG. 14) does not include the signature of interest the same reference image fragment (Template Position, X=190 and Y=120, indicated by cyan rectangle), does not positively match to any area on Image B.

See FIG. 14. Matching Results for Reference and Background Images

For this example of a step in the scanning process, the matching attempt comes up to some random area with wrong Shifts, low Score, and wrongly defined Rotation.

Thus, this computational experiment has been conducted purely under conditions of the same reference image, reference template plate position, threshold, and noise realization. It shows that our proprietary algorithms and software accurately identify the signature if it really exists in the analyzed image and reject identification if the image contains background only.

Linear and V-shaped structure were utilized for further identification. Images B in FIG. 15 and FIG. 16 have been strongly distorted including nonlinear geometrical stretch and powerful clutter.

See FIG. 15. Linear Trace Matching

See FIG. 16. V-Shaped Trace Matching

Despite these distortions, the correct matching has been accomplished, by the program. The displayed experimental results demonstrate our software's capability under conditions of the strong distortions and noises making it reasonable to utilize this solution approach for small and low-contrast target detection and identification.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

I claim:

1. A computer-implemented method to be performed by a computer processing system for identifying whether an identification image matches a previously-presented reference image, the method comprising:
   implementing the following steps by one or more computer processors:
   in an enrollment stage:
   receiving a plurality of reference images;
   for each reference image of the plurality of reference images:
   generating a formation template for the reference image having an array of response function values representing a plurality of points included in the reference image;
   generating a dynamic threshold for the formation template, wherein the dynamic threshold is a function of uniqueness of the array of response function values in the formation template; and
   storing the formation template and the dynamic threshold for the formation template in the computer processing system among a plurality of formation templates and associated dynamic thresholds generated for the plurality of reference images;
   in a recognition stage:
   receiving an identification image;
   generating an identification template for the identification image having an array of response function values representing a plurality of points in the identification image;
   performing matching runs against the plurality of formation templates and associated dynamic thresholds, wherein the identification image is considered identified against a particular formation template when a particular dynamic threshold associated with the particular formation template is exceeded,
   wherein a response function used in generating the plurality of formation templates and the identification template includes strong neighbor/area fragment overlapping.

2. The computer-implemented method of claim 1, wherein a response function used in generating the plurality of formation templates and the identification template includes separate pixel matching contributions.

3. The computer-implemented method of claim 1, wherein in the performing matching runs of the identification template against the plurality of formation templates and associated dynamic templates further comprises coarsening the identification template and the plurality of formation templates during one or more preliminary matching runs to identify a subset of the plurality of formation templates likely to present a match for the identification template.

4. The computer implemented method of claim 1, wherein the identification image is received from a user of an automotive keyless access system.

5. The computer implemented method of claim 1, wherein the identification image is received from a user of a home keyless access system.

6. The computer implemented method of claim 1, wherein the identification image is received from a user of a gun control system.

7. The computer implemented method of claim 1, wherein the identification image is received from a user of point-of-sale account system.

8. A computer-implemented system for identifying whether an identification image matches a previously-presented reference image, the system comprising:
   implementing the following steps by one or more computer processors:
   in an enrollment stage:
   receiving a plurality of reference images;
   for each reference image of the plurality of reference images:
   generating a formation template for the reference image having an array of response function values representing a plurality of points included in the reference image;
   generating a dynamic threshold for the formation template, wherein the dynamic threshold is a function of uniqueness of the array of response function values in the formation template; and
   storing the formation template and the dynamic threshold for the formation template in the computer processing system among a plurality of formation templates and associated dynamic thresholds generated for the plurality of reference images;
   in a recognition stage:
   receiving an identification image;
   generating an identification template for the identification image having an array of response function values representing a plurality of points in the identification image;
   performing matching runs against the plurality of formation templates and associated dynamic thresholds, wherein the identification image is considered identified against a particular formation template when a particular dynamic threshold associated with the particular formation template is exceeded,
   wherein a response function used in generating the plurality of formation templates and the identification template includes strong neighbor/area fragment overlapping.

9. The computer-implemented system of claim 8, wherein a response function used in generating the plurality of formation templates and the identification template includes separate pixel matching contributions.

10. The computer implemented system of claim 8, wherein the identification image is received from a user of an automotive keyless access system.

11. The computer implemented system of claim 8, wherein the identification image is received from a user of a home keyless access system.

12. The computer implemented system of claim 8, wherein the identification image is received from a user of a gun control system.

13. The computer implemented system of claim 8, wherein the identification image is received from a user of point-of-sale account system.

* * * * *